United States Patent
Bai et al.

(10) Patent No.: US 12,526,670 B2
(45) Date of Patent: Jan. 13, 2026

(54) ENHANCED BEAM FAILURE DETECTION FOR CANDIDATE CELLS

(71) Applicant: QUALCOMM Incorporated, San Diego, CA (US)

(72) Inventors: Tianyang Bai, Somerville, NJ (US); Yan Zhou, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 408 days.

(21) Appl. No.: 18/169,809

(22) Filed: Feb. 15, 2023

(65) Prior Publication Data

US 2024/0276257 A1 Aug. 15, 2024

(51) Int. Cl.
*H04W 24/08* (2009.01)
*H04W 36/30* (2009.01)

(52) U.S. Cl.
CPC ......... *H04W 24/08* (2013.01); *H04W 36/305* (2018.08)

(58) Field of Classification Search
CPC ............................. H04W 24/08; H04W 36/305
See application file for complete search history.

(56) References Cited

U.S. PATENT DOCUMENTS

| | | | | |
|---|---|---|---|---|
| 2021/0282168 | A1* | 9/2021 | Matsumura | H04L 5/0048 |
| 2022/0116094 | A1* | 4/2022 | Wang | H04B 7/0695 |
| 2023/0199528 | A1* | 6/2023 | Kang | H04W 72/046 370/328 |
| 2023/0262820 | A1* | 8/2023 | Song | H04W 24/08 370/329 |
| 2024/0007879 | A1* | 1/2024 | Liu | H04W 74/0833 |
| 2024/0032083 | A1* | 1/2024 | Zhang | H04B 7/06964 |
| 2024/0056160 | A1* | 2/2024 | Zhang | H04B 7/06964 |
| 2024/0138014 | A1* | 4/2024 | Jung | H04B 7/06964 |
| 2024/0259843 | A1* | 8/2024 | Zhu | H04L 1/1812 |

* cited by examiner

*Primary Examiner* — Hashim S Bhatti
(74) *Attorney, Agent, or Firm* — Paul M. McAdams; Polsinelli LLP

(57) ABSTRACT

Disclosed are systems and techniques for wireless communications. For instance, a process may include receiving an indication to monitor one or more beam failure detection reference signals (BFD RSs) from a set of cells, wherein the set of cells includes a first candidate cell, monitoring the one or more BFD RSs from the set of cells, detecting a beam failure from a cell of the set of cells, transmitting a beam failure request (BFRQ) message including an indication of the beam failure, and stopping monitoring the cell based on the detected beam failure.

30 Claims, 9 Drawing Sheets

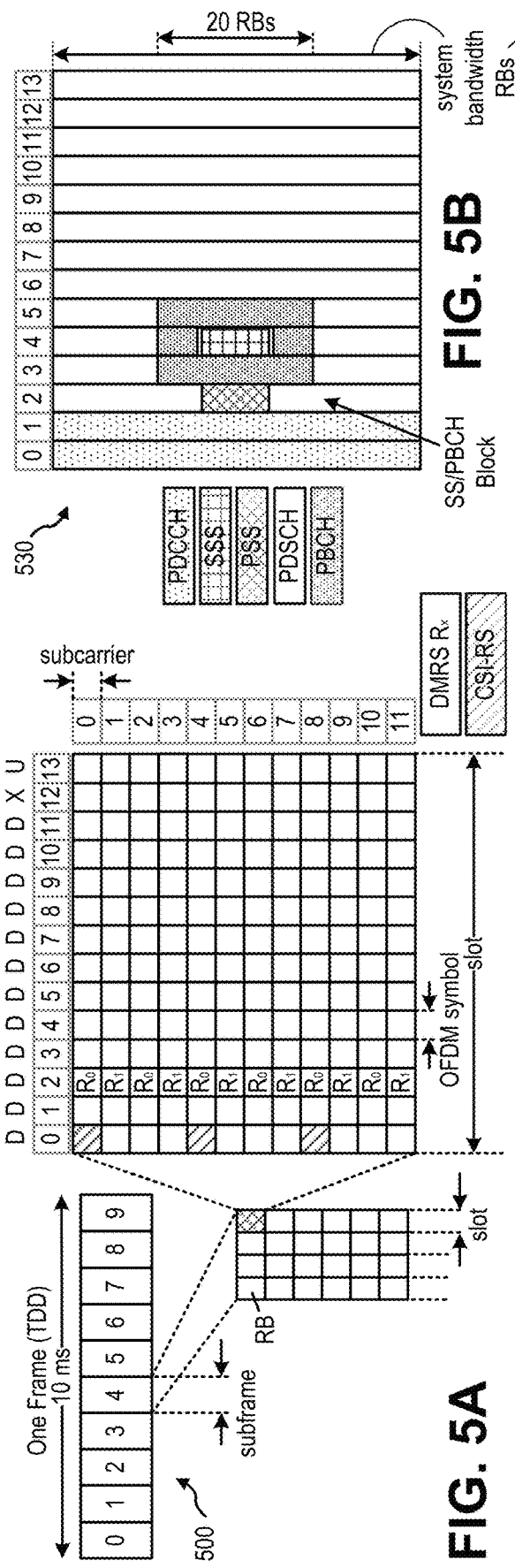
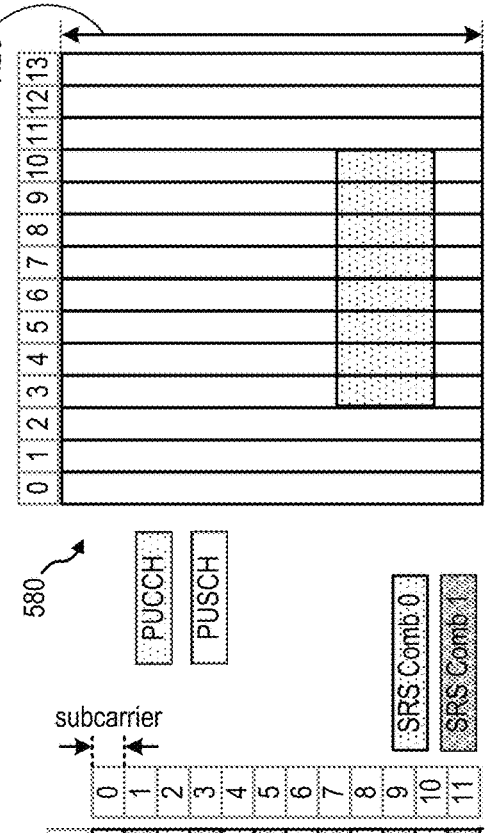
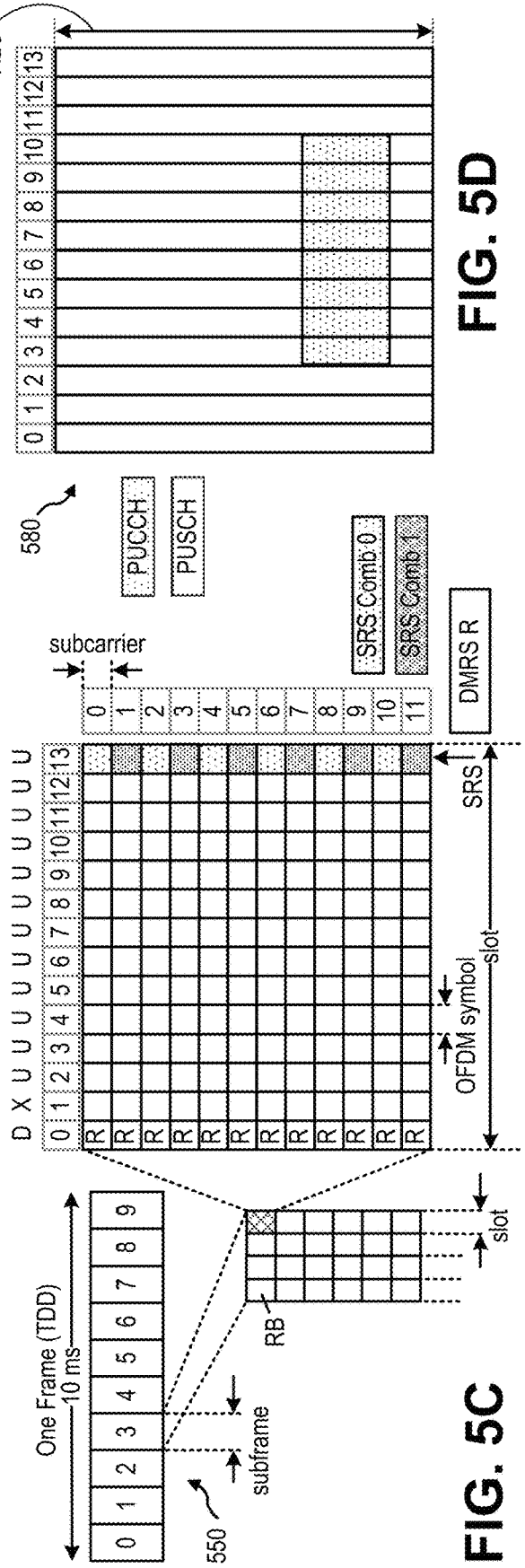
FIG. 5A
FIG. 5B
FIG. 5C
FIG. 5D

ENHANCED BEAM FAILURE DETECTION FOR CANDIDATE CELLS

FIELD

The present disclosure generally relates to wireless communications. For example, aspects of the present disclosure relate to systems and techniques for providing enhanced beam failure detection for candidate cells in wireless systems such as wireless communication systems.

BACKGROUND

Wireless communications systems are deployed to provide various telecommunications and data services, including telephony, video, data, messaging, and broadcasts. Broadband wireless communications systems have developed through various generations, including a first-generation analog wireless phone service (1G), a second-generation (2G) digital wireless phone service (including interim 2.5G networks), a third-generation (3G) high speed data, Internet-capable wireless device, and a fourth-generation (4G) service (e.g., Long-Term Evolution (LTE), WiMax). Examples of wireless communications systems include code division multiple access (CDMA) systems, time division multiple access (TDMA) systems, frequency division multiple access (FDMA) systems, orthogonal frequency division multiple access (OFDMA) systems, Global System for Mobile communication (GSM) systems, etc. Other wireless communications technologies include 802.11 Wi-Fi, Bluetooth, among others.

A fifth-generation (5G) mobile standard calls for higher data transfer speeds, greater number of connections, and better coverage, among other improvements. The 5G standard (also referred to as "New Radio" or "NR"), according to Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments.

Although wireless communication systems have made great technological advancements over many years, challenges still exist. For example, complex and dynamic environments can still attenuate or block signals between wireless transmitters and wireless receivers, undermining a throughput a wireless device is able to achieve to a particular wireless network, given the wireless nodes that can be used to access the wireless network. Consequently, an ability of a wireless device, such as user equipment (UE), to select from multiple wireless networks, such from among a 5G and another wireless network, or from among multiple 5G networks should be enhanced.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Disclosed are systems, methods, apparatuses, and computer-readable media for performing wireless communications. In one illustrative example, an apparatus for wireless communications is provided that includes at least one memory and at least one processor (e.g., implemented in circuitry) coupled to the at least one memory. The at least one processor is configured to: receive an indication to monitor one or more beam failure detection reference signals (BFD RSs) from a set of cells, wherein the set of cells includes a first candidate cell; monitor the one or more BFD RSs from the set of cells; detect a beam failure from a cell of the set of cells; transmit a beam failure request (BFRQ) message including an indication of the beam failure; and stop monitoring the cell based on the detected beam failure.

As another example, a method for wireless communications is provided. The methods includes: receiving an indication to monitor one or more beam failure detection reference signals (BFD RSs) from a set of cells, wherein the set of cells includes a first candidate cell; monitoring the one or more BFD RSs from the set of cells; detecting a beam failure from a cell of the set of cells; transmitting a beam failure request (BFRQ) message including an indication of the beam failure; and stopping monitoring the cell based on the detected beam failure.

In another example, a non-transitory computer-readable medium is provided that has stored thereon instructions that, when executed by at least one processor, cause the at least one processor to: receive an indication to monitor one or more beam failure detection reference signals (BFD RSs) from a set of cells, wherein the set of cells includes a first candidate cell; monitor the one or more BFD RSs from the set of cells; detect a beam failure from a cell of the set of cells; transmit a beam failure request (BFRQ) message including an indication of the beam failure; and stop monitoring the cell based on the detected beam failure.

As another example, an apparatus for wireless communications is provided. The apparatus includes: means for receiving an indication to monitor one or more beam failure detection reference signals (BFD RSs) from a set of cells, wherein the set of cells includes a first candidate cell; means for monitoring the one or more BFD RSs from the set of cells; means for detecting a beam failure from a cell of the set of cells; means for transmitting a beam failure request (BFRQ) message including an indication of the beam failure; and means for stopping monitoring the cell based on the detected beam failure.

In some aspects, one or more of the apparatuses described herein is, is a part of, or includes a mobile device (e.g., a mobile telephone or so-called "smart phone", a tablet computer, or other type of mobile device), a wearable device, an extended reality device (e.g., a virtual reality (VR) device, an augmented reality (AR) device, or a mixed reality (MR) device), a personal computer, a laptop computer, a video server, a television (e.g., a network-connected television), a vehicle (or a computing device or system of a vehicle), or other device. In some aspects, the apparatus includes at least one camera for capturing one or more images or video frames. For example, the apparatus can include a camera (e.g., an RGB camera) or multiple cameras for capturing one or more images and/or one or more videos including video frames. In some aspects, the apparatus includes a display for displaying one or more images, videos, notifications, or other displayable data. In some aspects, the apparatus includes a transmitter configured to transmit one or more video frame and/or syntax data over a transmission medium to at least one device. In some aspects, the processor includes a neural processing unit (NPU), a central processing unit (CPU), a graphics processing unit (GPU), or other processing device or component.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description.

BRIEF DESCRIPTION OF THE DRAWINGS

Examples of various implementations are described in detail below with reference to the following figures:

FIGS. 5A-5D depict various example aspects of data structures for a wireless communication network, in accordance with some examples;

DETAILED DESCRIPTION

Figure 1:
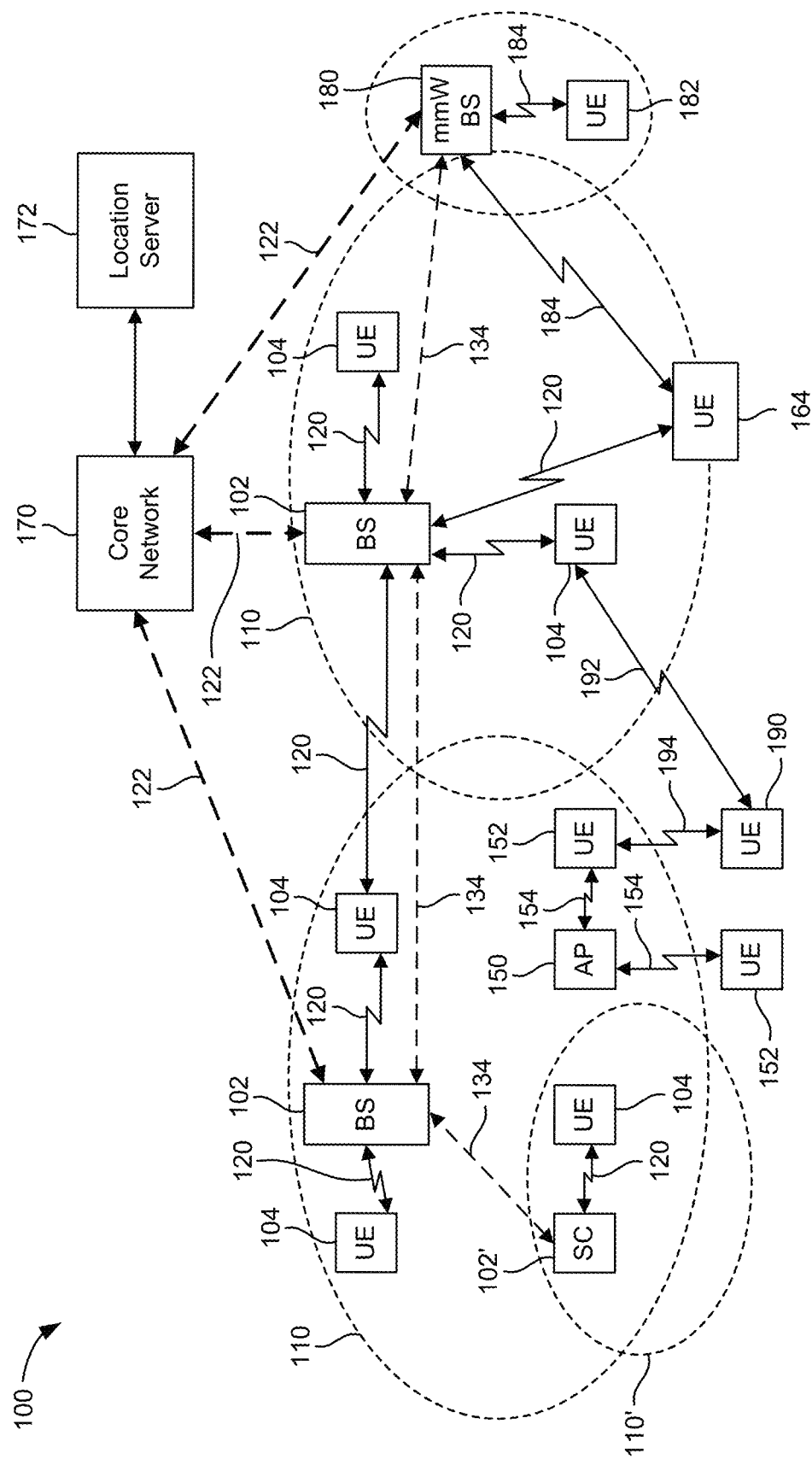
FIG. 1 is a block diagram illustrating an example of a wireless communication network, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

In some cases, a wireless device, such as user equipment (UE) may be wirelessly coupled to a serving cell using narrow-beam transmissions. A serving cell is a cell providing communications services to a UE. In some examples, a beam failure may occur where signal quality of beams being used for transmissions falls below a signal quality threshold. In such examples, the wireless device may detect the beam failure and perform a beam failure recovery (BFR) procedure. In current systems, the UE may perform the BFR procedure with respect to the serving cell to identify a new beam for re-connecting to the serving cell. However, in some cases, the UE may not be able to identify a sufficiently high enough quality new beam to reconnect with the serving cell. In some cases, a UE may be capable of monitoring reference signals (RS) from multiple cells, and while a UE may not be able to identify a sufficiently high enough quality new beam for reconnecting with the serving cell, the UE may be able to identify a sufficiently high enough quality new beam for connecting to a non-serving cell. In such cases, it may be useful to allow the BFR procedure to be performed with respect to non-serving cells.

Systems, apparatuses, electronic devices, methods (also referred to as processes), and computer-readable media (collectively referred to herein as "systems and techniques") are described herein for performing an enhanced BFR procedure for non-serving cells, also referred to herein as candidate cells. For example, a UE may be configured to monitor one or more beam failure detection (BFD) RSs from candidate cells, in addition to one or more BFD RSs from a serving cell. In some examples, such as where the UE cannot identify a sufficiently high enough quality new beam to reconnect with the serving cell, and the UE is able to identify a sufficiently high enough quality new beam to connect with a non-serving cell, the UE may perform a cell switching procedure to connect with the non-serving cell. In some cases, the cell switching may be performed by the UE autonomously.

In some cases, where the UE is configured to monitor BFD RS from non-serving cells, the UE may detect a beam failure for a non-serving cell (e.g., candidate cell). In such cases, the UE may report the BFD to the serving cell and the UE may stop monitoring the non-serving cell associated with the detected beam failure.

Additional aspects of the present disclosure are described in more detail below.

Wireless networks are deployed to provide various communication services, such as voice, video, packet data, messaging, broadcast, and the like. A wireless network may support both access links for communication between wireless devices. An access link may refer to any communication link between a client device (e.g., a user equipment (UE), a station (STA), or other client device) and a base station (e.g., a 3GPP gNodeB (gNB) for 5G/NR, a 3GPP eNodeB (eNB) for LTE, a Wi-Fi access point (AP), or other base station) or a component of a disaggregated base station (e.g., a central unit, a distributed unit, and/or a radio unit). In one example, an access link between a UE and a 3GPP gNB may be over a Uu interface. In some cases, an access link may support uplink signaling, downlink signaling, connection procedures, etc.

In some aspects, wireless communications networks may be implemented using one or more modulation schemes. For example, a wireless communication network may be implemented using a quadrature amplitude modulation (QAM) scheme such as 16QAM, 32QAM, 64QAM, etc.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs may communicate with a core network via a RAN, and through the core network the UEs may be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

A network entity may be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs may send signals to a base station is called an uplink (UL) channel (e.g., a reverse traffic channel, a reverse control channel, an access channel, etc.). A communication link through which the base station may send signals to UEs is called a downlink (DL) or forward link channel (e.g., a paging channel, a control channel, a broadcast channel, or a forward traffic channel, etc.). The term traffic channel (TCH), as used herein, may refer to either an uplink, reverse or downlink, and/or a forward traffic channel.

The term "network entity" or "base station" (e.g., with an aggregated/monolithic base station architecture or disaggregated base station architecture) may refer to a single physical transmit receive point (TRP) or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Various aspects of the systems and techniques described herein will be discussed below with respect to the figures. According to various aspects, FIG. 1 illustrates an example of a wireless communications system 100. The wireless communications system 100 (which may also be referred to as a wireless wide area network (WWAN)) may include various base stations 102 and various UEs 104. In some aspects, the base stations 102 may also be referred to as "network entities" or "network nodes." One or more of the base stations 102 may be implemented in an aggregated or monolithic base station architecture. Additionally, or alternatively, one or more of the base stations 102 may be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to a long term evolution (LTE) network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency may be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a WLAN AP 150 in communication with WLAN stations (STAs) 152 via communication links 154 in an unlicensed frequency spectrum (e.g., 5 Gigahertz (GHz)). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 may include devices (e.g., UEs, etc.) that communicate with one or more UEs 104, base stations 102, APs 150, etc. utilizing the ultra-wideband (UWB) spectrum. The UWB spectrum may range from 3.1 to 10.5 GHz.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 180 and the UE 182 may utilize beamforming (transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

In some aspects relating to 5G, the frequency spectrum in which wireless network nodes or entities (e.g., base stations 102/180, UEs 104/182) operate is divided into multiple frequency ranges, FR1 (from 450 to 6000 Megahertz (MHz)), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency and/or component carrier over which some base station is communicating, the term "cell," "serving cell," "component carrier," "carrier frequency," and the like may be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHz) bandwidth per carrier up to a total of Yx MHz (x component carriers) for transmission in each direction. The component carriers may or may not be adjacent to each other on the frequency spectrum. Allocation of carriers may be asymmetric with respect to the downlink and uplink (e.g., more or less carriers may be allocated for downlink than for uplink). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In order to operate on multiple carrier frequencies, a base station 102 and/or a UE 104 may be equipped with multiple receivers and/or transmitters. For example, a UE 104 may have two receivers, "Receiver 1" and "Receiver 2," where "Receiver 1" is a multi-band receiver that may be tuned to band (i.e., carrier frequency) 'X' or band 'Y,' and "Receiver 2" is a one-band receiver tuneable to band 'Z' only. In this example, if the UE 104 is being served in band 'X,' band 'X' would be referred to as the PCell or the active carrier frequency, and "Receiver 1" would need to tune from band 'X' to band 'Y' (an SCell) in order to measure band 'Y' (and vice versa). In contrast, whether the UE 104 is being served in band 'X' or band 'Y,' because of the separate "Receiver 2," the UE 104 may measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 2:
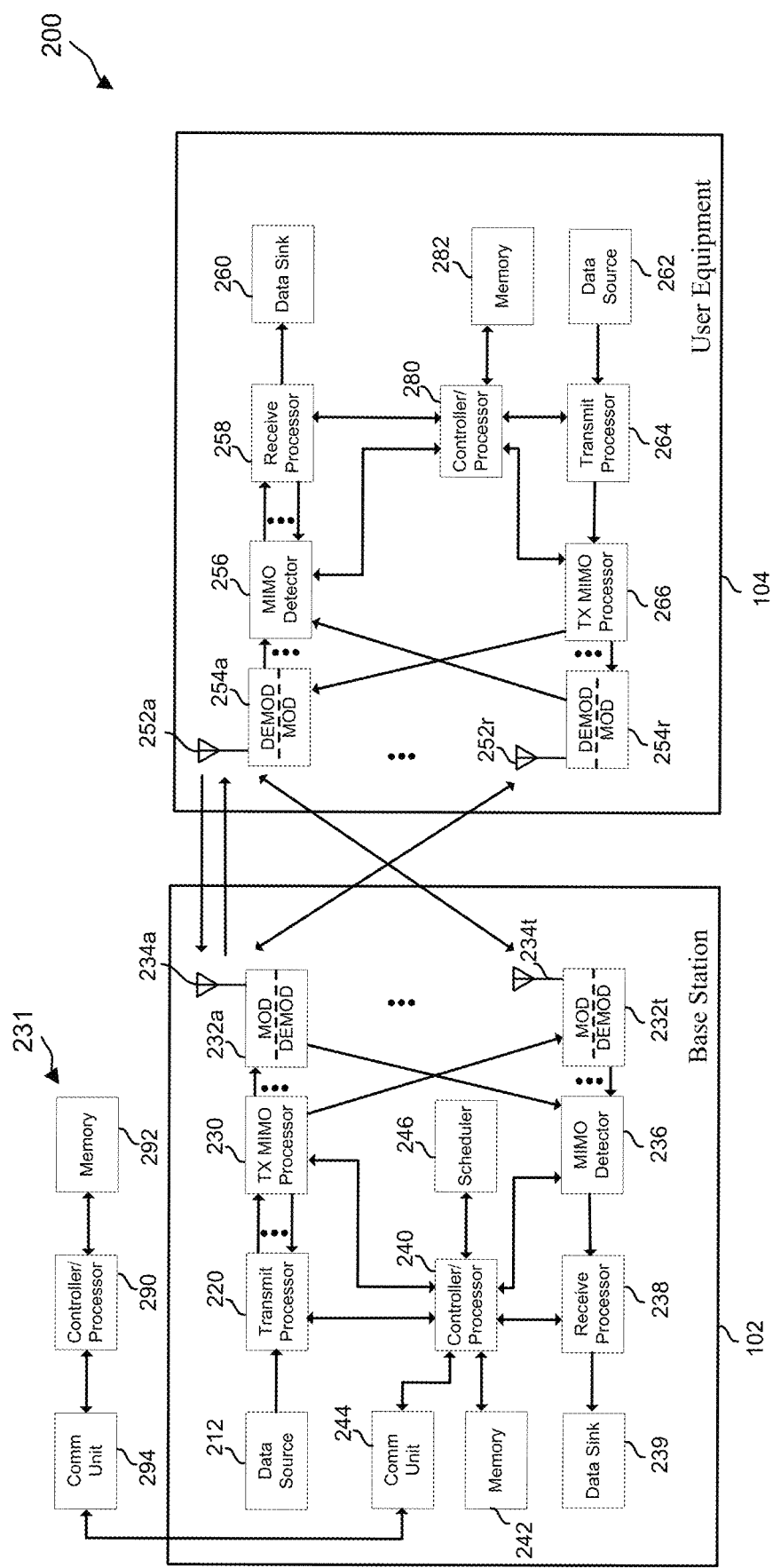
FIG. 2 is a diagram illustrating a design of a base station and a User Equipment (UE) device that enable transmission and processing of signals exchanged between the UE and the base station, in accordance with some examples.

FIG. 2 shows a block diagram of a design of a base station 102 and a UE 104 that enable transmission and processing of signals exchanged between the UE and the base station, in accordance with some aspects of the present disclosure. Design 200 includes components of a base station 102 and a UE 104, which may be one of the base stations 102 and one of the UEs 104 in FIG. 1. Base station 102 may be equipped with T antennas 234a through 234t, and UE 104 may be equipped with R antennas 252a through 252r, where in general T≥1 and R≥1.

At base station 102, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. The modulators 232a through 232t are shown as a combined modulator-demodulator (MOD-DEMOD). In some cases, the modulators and demodulators may be separate components. Each modulator of the modulators 232a to 232t may process a respective output symbol stream, e.g., for an orthogonal frequency-division multiplexing (OFDM) scheme and/or the like, to obtain an output sample stream. Each modulator of the modulators 232a to 232t may further process (e.g., convert to analog, amplify, filter, and upconvert) the output sample stream to obtain a downlink signal. T downlink signals may be transmitted from modulators 232a to 232t via T antennas 234a through 234t, respectively. According to certain aspects described in more detail below, the synchronization signals may be generated with location encoding to convey additional information.

At UE 104, antennas 252a through 252r may receive the downlink signals from base station 102 and/or other base stations and may provide received signals to demodulators (DEMODs) 254a through 254r, respectively. The demodulators 254a through 254r are shown as a combined modulator-demodulator (MOD-DEMOD). In some cases, the modulators and demodulators may be separate components. Each demodulator of the demodulators 254a through 254r may condition (e.g., filter, amplify, downconvert, and digitize) a received signal to obtain input samples. Each demodulator of the demodulators 254a through 254r may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 104, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals (e.g., based at least in part on a beta value or a set of beta values associated with the one or more reference signals). The symbols from transmit processor 264 may be precoded by a TX-MIMO processor 266 if application, further processed by modulators 254a through 254r (e.g., for DFT-s-OFDM, CP-OFDM, and/or the like), and transmitted to base station 102. At base station 102, the uplink signals from UE 104 and other UEs may be received by antennas 234a through 234t, processed by demodulators 232a through 232t, detected by a MIMO detector 236 if applicable, and further processed by a receive processor 238 to obtain decoded data and control information sent by UE 104. Receive processor 238 may provide the decoded data to a data sink 239 and the decoded control information to controller (processor) 240. Base station 102 may include communication unit 244 and communicate to a network controller 231 via communication unit 244. Network controller 231 may include communication unit 294, controller/processor 290, and memory 292.

In some aspects, one or more components of UE 104 may be included in a housing. Controller 240 of base station 102, controller/processor 280 of UE 104, and/or any other component(s) of FIG. 2 may perform one or more techniques associated with implicit UCI beta value determination for NR.

Memories 242 and 282 may store data and program codes for the base station 102 and the UE 104, respectively. A scheduler 246 may schedule UEs for data transmission on the downlink, uplink, and/or sidelink.

In some aspects, deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also may be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which may enable flexibility in network design. The various units of the disaggregated base station, or disaggregated RAN architecture, may be configured for wired or wireless communication with at least one other unit.

Figure 3:
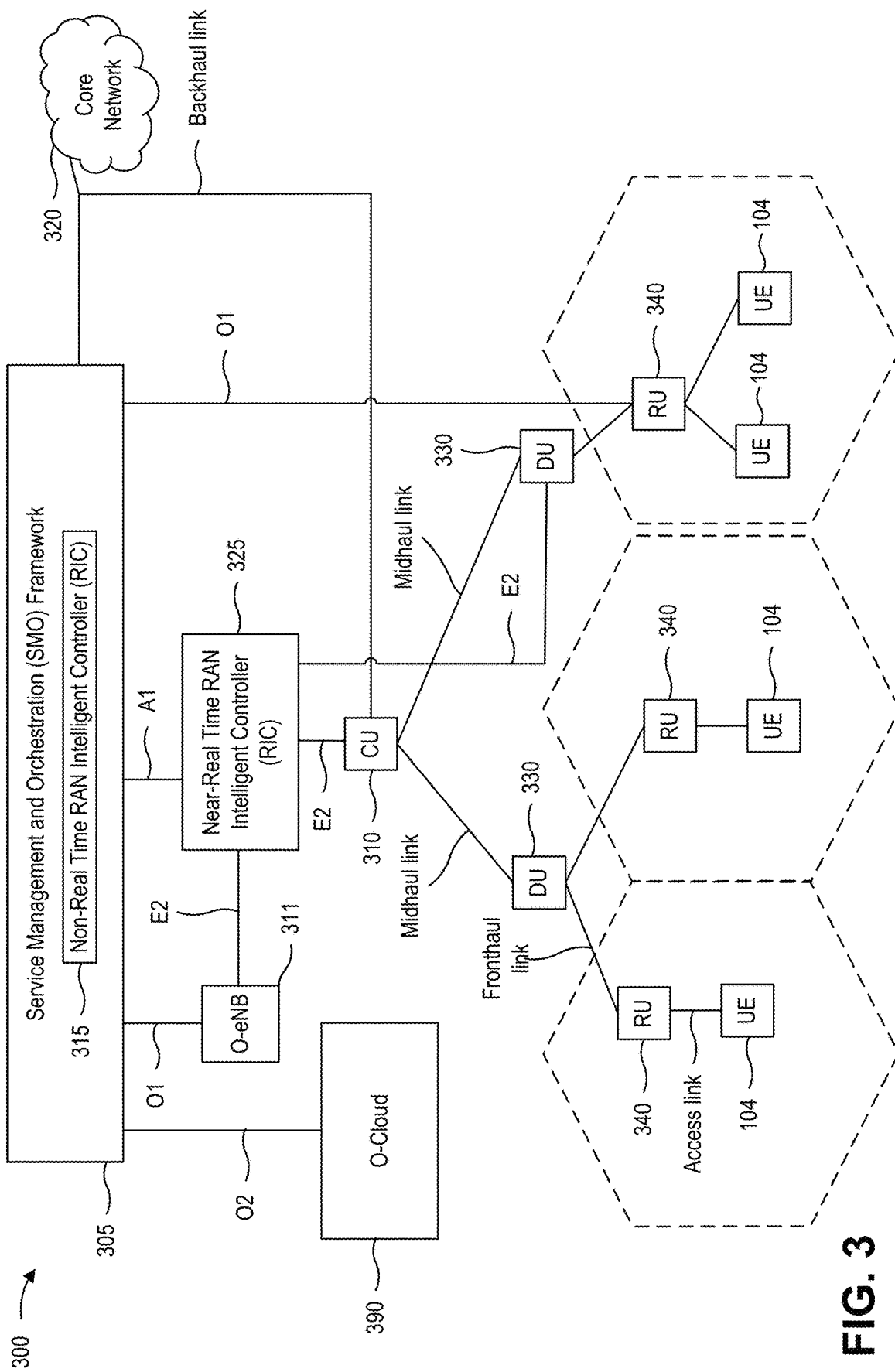
FIG. 3 is a diagram illustrating an example of a disaggregated base station, in accordance with some examples.

FIG. 3 shows a diagram illustrating an example disaggregated base station 300 architecture. The disaggregated base station 300 architecture may include one or more central units (CUs) 310 that may communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 104 via one or more radio frequency (RF) access links. In some implementations, the UE 104 may be simultaneously served by multiple RUs 340.

Each of the units, e.g., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, may be configured to communicate with one or more of the other units via the transmission medium. For example, the units may include a wired interface configured to receive or transmit signals over a wired transmission medium to one or more of the other units. Additionally, the units may include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions may include radio resource control (RRC), packet data convergence protocol (PDCP), service data adaptation protocol (SDAP), or the like. Each control function may be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 may be logically split into one or more CU-UP units and one or more CU-CP units. The CU-UP unit may communicate bidirectionally with the CU-CP unit via an interface, such as the E1 interface when implemented in an O-RAN configuration. The CU 310 may be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) may be implemented with an interface configured to communicate signals with other layers (and modules) hosted by the DU 330, or with the control functions hosted by the CU 310.

Lower-layer functionality may be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 may be implemented to handle over the air (OTA) communication with one or more UEs 104. In some implementations, real-time and non-real-time aspects of control and user plane communication with the RU(s) 340 may be controlled by the corresponding DU 330. In some scenarios, this configuration may enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements may include, but are not limited to, CUs 310, DUs 330, RUs 340 and Near-RT RICs 325. In some implementations, the SMO Framework 305 may communicate with a hardware aspect of a 4G RAN, such as an open eNB (O-eNB) 311, via an O1 interface. Additionally, in some implementations, the SMO Framework 305 may communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

Figure 4:
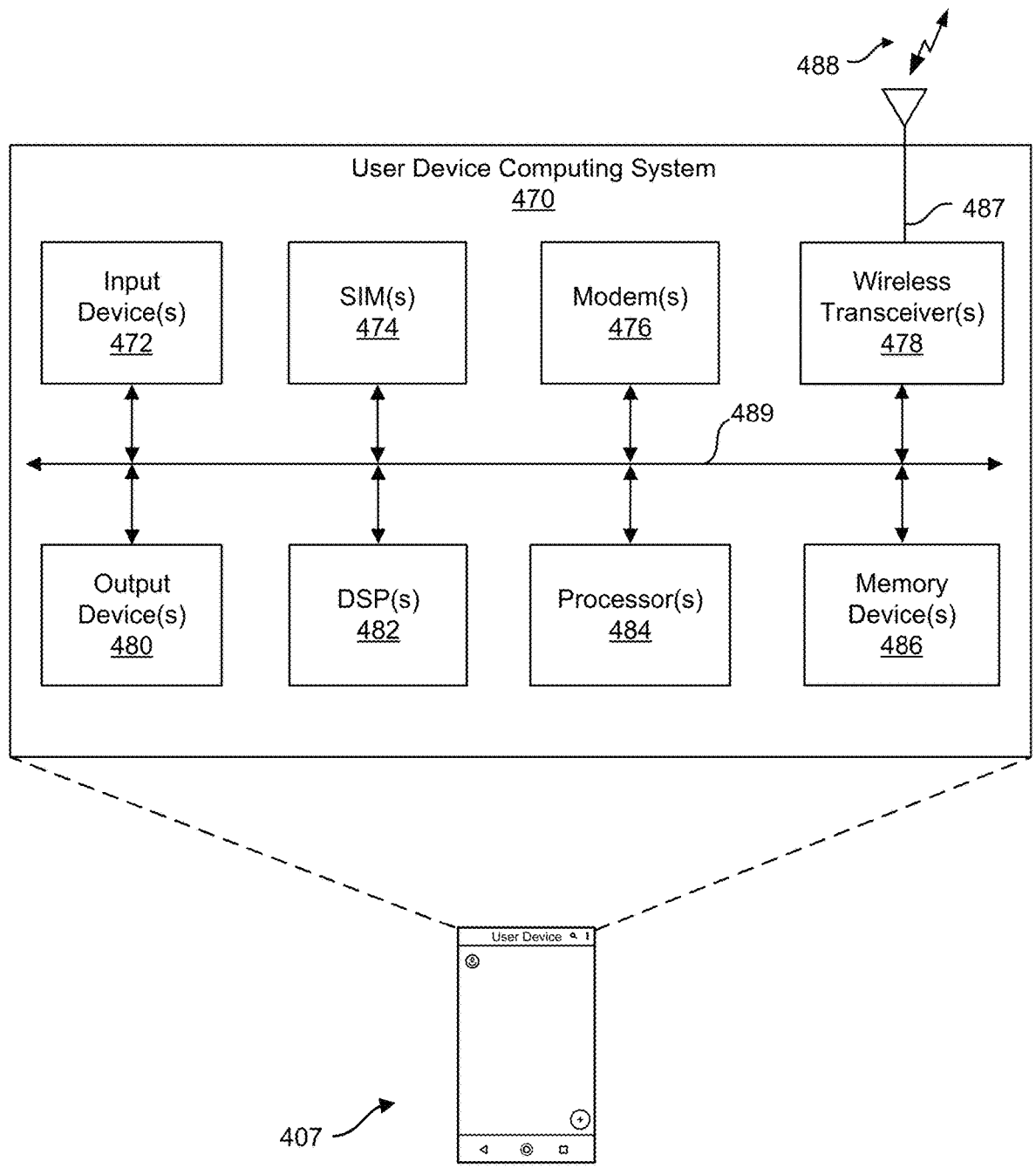
FIG. 4 is a block diagram illustrating components of a user equipment, in accordance with some examples.

FIG. 4 illustrates an example of a computing system 470 of a wireless device 407. The wireless device 407 may include a client device such as a UE (e.g., UE 104, UE 152, UE 190) or other type of device (e.g., a station (STA) configured to communication using a Wi-Fi interface) that may be used by an end-user. For example, the wireless device 407 may include a mobile phone, router, tablet computer, laptop computer, tracking device, wearable device (e.g., a smart watch, glasses, an extended reality (XR) device such as a virtual reality (VR), augmented reality (AR) or mixed reality (MR) device, etc.), Internet of Things (IoT) device, access point, and/or another device that is configured to communicate over a wireless communications network. The computing system 470 includes software and hardware components that may be electrically or communicatively coupled via a bus 489 (or may otherwise be in communication, as appropriate). For example, the computing system 470 includes one or more processors 484. The one or more processors 484 may include one or more CPUs, ASICs, FPGAs, APs, GPUs, VPUs, NSPs, microcontrollers, dedicated hardware, any combination thereof, and/or other processing device or system. The bus 489 may be used by the one or more processors 484 to communicate between cores and/or with the one or more memory devices 486.

The computing system 470 may also include one or more memory devices 486, one or more digital signal processors (DSPs) 482, one or more subscriber identity modules (SIMs) 474, one or more modems 476, one or more wireless transceivers 478, one or more antennas 487, one or more input devices 472 (e.g., a camera, a mouse, a keyboard, a touch sensitive screen, a touch pad, a keypad, a microphone, and/or the like), and one or more output devices 480 (e.g., a display, a speaker, a printer, and/or the like).

In some aspects, computing system 470 may include one or more radio frequency (RF) interfaces configured to transmit and/or receive RF signals. In some examples, an RF interface may include components such as modem(s) 476, wireless transceiver(s) 478, and/or antennas 487. The one or more wireless transceivers 478 may transmit and receive wireless signals (e.g., signal 488) via antenna 487 from one or more other devices, such as other wireless devices, network devices (e.g., base stations such as eNBs and/or gNBs, Wi-Fi access points (APs) such as routers, range extenders or the like, etc.), cloud networks, and/or the like. In some examples, the computing system 470 may include multiple antennas or an antenna array that may facilitate simultaneous transmit and receive functionality. Antenna 487 may be an omnidirectional antenna such that radio frequency (RF) signals may be received from and transmitted in all directions. The wireless signal 488 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the wireless signal 488 may be transmitted directly to other wireless devices using sidelink communications (e.g., using a PC5 interface, using a DSRC interface, etc.). Wireless transceivers 478 may be configured to transmit RF signals for performing sidelink communications via antenna 487 in accordance with one or more transmit power parameters that may be associated with one or more regulation modes. Wireless transceivers 478 may also be configured to receive sidelink communication signals having different signal parameters from other wireless devices.

In some examples, the one or more wireless transceivers 478 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end may generally handle selection and conversion of the wireless signals 488 into a baseband or intermediate frequency and may convert the RF signals to the digital domain.

In some cases, the computing system 470 may include a coding-decoding device (or CODEC) configured to encode and/or decode data transmitted and/or received using the one or more wireless transceivers 478. In some cases, the computing system 470 may include an encryption-decryption device or component configured to encrypt and/or decrypt data (e.g., according to the AES and/or DES standard) transmitted and/or received by the one or more wireless transceivers 478.

The one or more SIMs 474 may each securely store an international mobile subscriber identity (IMSI) number and related key assigned to the user of the wireless device 407. The IMSI and key may be used to identify and authenticate the subscriber when accessing a network provided by a network service provider or operator associated with the one or more SIMs 474. The one or more modems 476 may modulate one or more signals to encode information for transmission using the one or more wireless transceivers 478. The one or more modems 476 may also demodulate signals received by the one or more wireless transceivers 478 in order to decode the transmitted information. In some examples, the one or more modems 476 may include a Wi-Fi modem, a 4G (or LTE) modem, a 5G (or NR) modem, and/or other types of modems. The one or more modems 476 and the one or more wireless transceivers 478 may be used for communicating data for the one or more SIMs 474.

The computing system 470 may also include (and/or be in communication with) one or more non-transitory machine-readable storage media or storage devices (e.g., one or more memory devices 486), which may include, without limitation, local and/or network accessible storage, a disk drive, a drive array, an optical storage device, a solid-state storage device such as a RAM and/or a ROM, which may be programmable, flash-updateable and/or the like. Such storage devices may be configured to implement any appropriate data storage, including without limitation, various file systems, database structures, and/or the like.

In various embodiments, functions may be stored as one or more computer-program products (e.g., instructions or code) in memory device(s) 486 and executed by the one or more processor(s) 484 and/or the one or more DSPs 482. The computing system 470 may also include software elements (e.g., located within the one or more memory devices 486), including, for example, an operating system, device drivers, executable libraries, and/or other code, such as one or more application programs, which may comprise computer programs implementing the functions provided by various embodiments, and/or may be designed to implement methods and/or configure systems, as described herein.

FIGS. 5A-5D depict various example aspects of data structures for a wireless communication system, such as wireless communication system 100 of FIG. 1. FIGS. 5A-5D depict aspects of data structures for a wireless communication network, such as wireless communication network 100 of FIG. 1. In particular, FIG. 5A is a diagram 500 illustrating an example of a first subframe within a 5G (e.g., 5G NR) frame structure, FIG. 5B is a diagram 530 illustrating an example of DL channels within a 5G subframe, FIG. 5C is a diagram 550 illustrating an example of a second subframe within a 5G frame structure, and FIG. 5D is a diagram 580 illustrating an example of UL channels within a 5G subframe.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 5A and 5C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 5A-5D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 5A, some of the REs carry reference (pilot) signals (RS) for a UE (e.g., UE 104, UE 152, UE 190). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 5B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., UE 104, UE 152, UE 190) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 5C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 5D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

In some cases, a UE may not be connected to a wireless network (e.g., when there is no NAS signaling connection between the UE and the wireless network). For example, a UE may just have been powered up, may exit from an airplane mode, may have entered a new service area, may receive RRC reconfiguration information, may be involved in a handover procedure, and the like. Such a disconnected UE may be in an idle state and the UE may listen for wireless networks for which to connect. After the UE identifies a wireless network, the UE may then attempt to connect to the wireless network. In some cases, the UE may attempt to connect to the wireless network via a wireless node to establish an RRC connection.

In some systems, narrow-beam transmission and reception may be useful for improving a link budget, such as at millimeter-wave (mmW) frequencies, but may be susceptible to beam failure. As an example, in mmW, directional beamforming may be used between the UE and a BS, and the UE and BS communicate via a beam pair link (BPL). A beam failure generally refers to a scenario in which the quality of a beam falls below a threshold, which may lead to radio link failure (RLF). NR supports a lower layer signaling to recover from beam failure, referred to as beam recovery. For example, instead of initiating a cell reselection when a beam quality becomes too low, a beam pair reselection within the cell may be performed.

Figure 6:
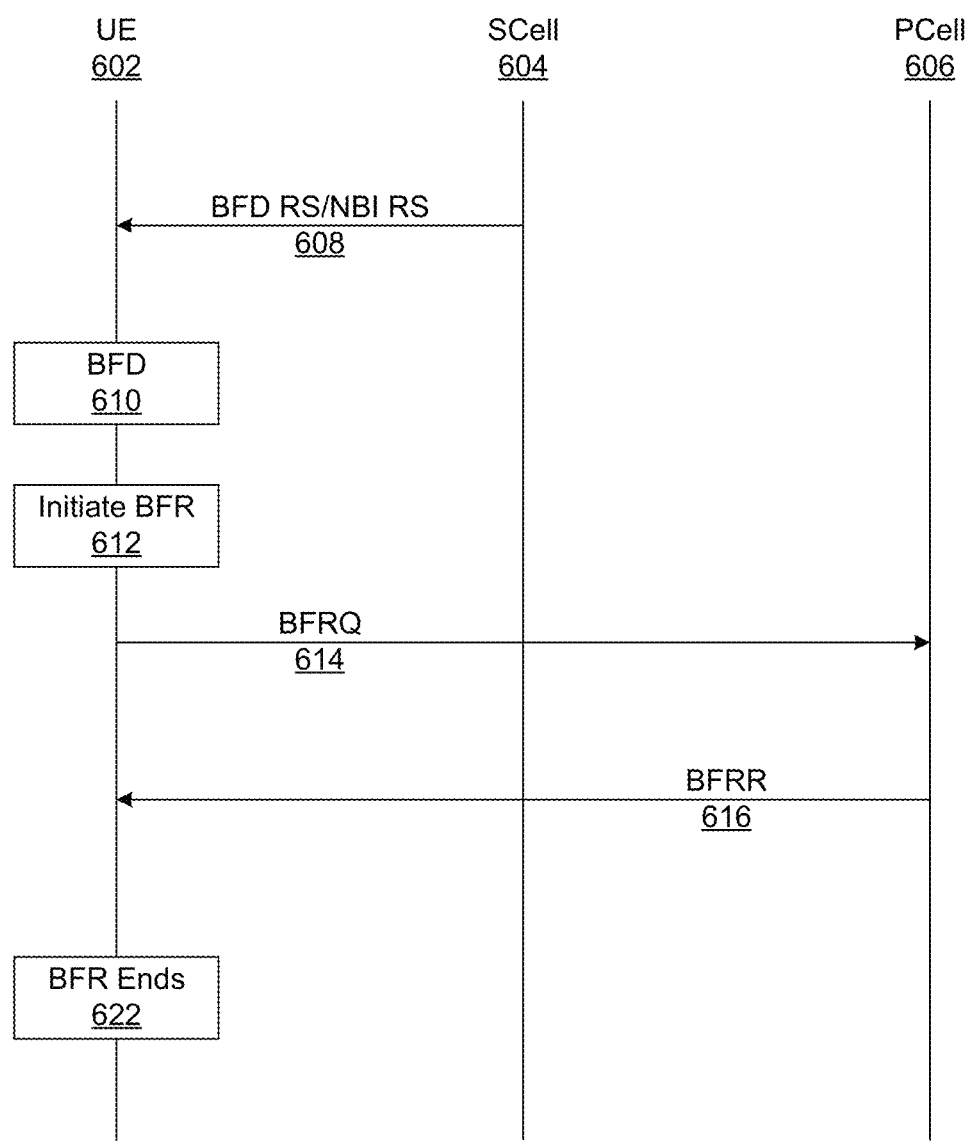
FIG. 6 is a call flow illustrating an example a beam failure detection (BFD) and beam failure recovery (BFR) procedure, in accordance with certain aspects of the present disclosure.

FIG. 6 is a call flow 600 illustrating an example a beam failure detection (BFD) and beam failure recovery (BFR) procedure, in accordance with certain aspects of the present disclosure. Beam failure may be detected by monitoring a BFD reference signal (BFD RS) for a current beam and assessing if a beam failure trigger condition has been met. In some cases, the UE 602 may be configured, for example, by a serving cell such as Scell 604, with the BFD RS. In some cases, the UE 602 may also be configured with a new beam identification (NBI) RS, which indicates a set of alternate beams from the Scell 604 that the UE 602 may monitor. In FIG. 6, the UE 602 monitors, at 608, the BFD RS and NBI RS on beams from the Scell 604. In some examples, beam failure detection is triggered if an estimated block error rate (BLER) of reference signals associated with a configured control resource set (CORESET) is above a threshold (e.g., 10%). In some examples, the UE 602 detects beam failure when the RSRP, RSSI, RSRQ, CQI or other signal quality measurement (based on the BFD RS) of a BPL fails to satisfy (e.g., is below) a threshold for a certain amount of time. Once BFD is detected 610, the UE 602 initiates beam failure recovery 612.

To recover the Scell 604, the UE 602 can send a beam failure request (BFRQ) message 614 to the gNB, such as by sending the BFRQ message 614 to the Pcell 606. In some cases, UE 602 may also monitor alternate beams, as indicated in the NBI RS, transmitted by the serving cell, such as Scell 604. In such cases, the UE 602 may determine if there is a replacement beam from Scell 604 that the UE 602 may switch to. If there is a viable replacement beam (e.g., alternate beam above the beam failure detection measures or another measurement of beam quality) from Scell 604, the UE 602 may indicate, in the BFRQ message 614, the replacement beam. If there are no viable alternate beams, the UE 602 may indicate that no replacement beam has been identified. In cases where a viable alternate beam is identified, the UE 602 may receive a beam failure recovery response (BFRR) message 616, such as from Pcell 606. In some cases, the UE 602 may autonomously switch to the identified alternate beam from the serving cell. For example, the UE 602 may switch to the identified alternate beam for SCell 604 28 symbols after receiving the BFRR message 616.

In some cases, such as where a cell can beamform with multiple beams in different directions, transmission configuration indicators (TCI) may be used. In some cases, the UE may monitor inter cell RS beams from other nearby macro cells and report back to the serving cell (e.g., serving macro cell). The serving cell may configure the UE with a TCI indicating beams for other macro cells that may be used when connecting to the other macro cells. Thus, a TCI list may be preconfigured for a new cell before the new cell is switched to. Then, if the UE receives a command to switch, via a MAC-CE or DCI, to the new macro cell that is referenced in the TCI, the UE may use the TCI information to identify a candidate beam for the new cell to connect.

To help further reduce latency when switching macro cells, it may be useful to provide a mechanism that allows for cell switching (e.g., switching macro cells) in response to a beam failure that can be performed at a L1/L2 level, rather than at a higher level, such as an RRC level.

In some cases, cell switching as a part of a BFR procedure may be performed to two type of candidate cells. The first type of candidate cell may include deactivated service cells, which may include cells which were once serving cells for a UE, but are now deactivated (e.g., no longer the serving cell for the UE). The other type of candidate cell may include non-serving macro cells, which may include macro cells other than the serving cell. In some cases, the BFRQ procedure may be enhanced to configure a UE to monitor (e.g., at 608 of FIG. 6) beams from candidate cells (e.g., BFD RS from another macro cell(s)) in addition to alternate beams from a serving cell. Additionally, in some cases, where there is a beam failure, the BFRQ message may be enhanced to include a cell index to indicate a candidate cell to switch to, along with a new beam index for indicating a beam of the serving cell or candidate cell to switch to. In some cases, the UE may be able to autonomously switch to the indicated candidate cell after the BFRQ.

Figure 7:
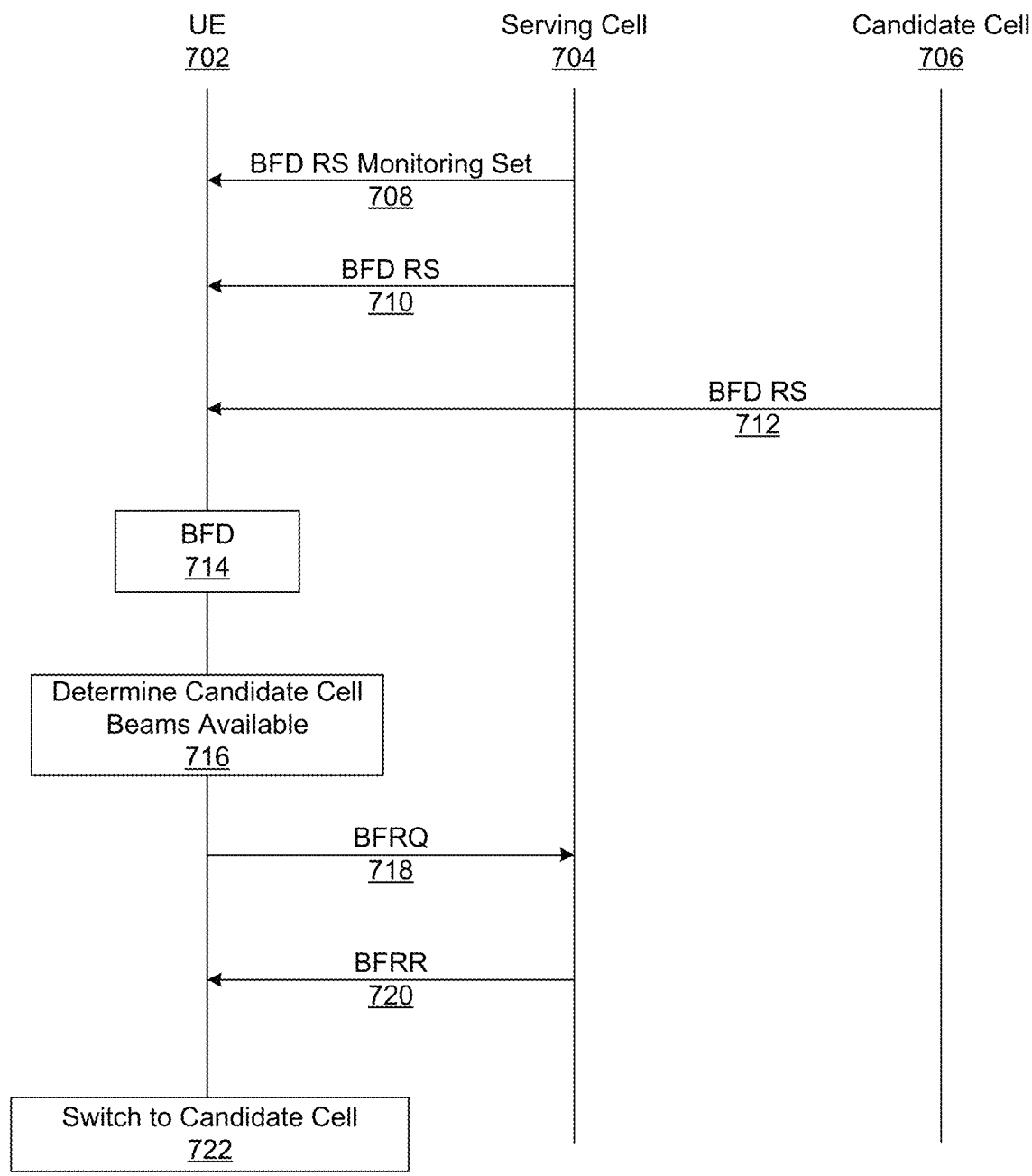
FIG. 7 is a call flow illustrating an example an enhanced BFD procedure and BFR where the UE switches to another cell, in accordance with certain aspects of the present disclosure.

FIG. 7 is a call flow 700 illustrating an example an enhanced BFD procedure and BFR where the UE switches to another cell, in accordance with certain aspects of the present disclosure. In FIG. 7, a UE 702 may be communicatively coupled to a serving cell 704. Other macro cells, such as candidate cell 706, may be located nearby such that UE 702 can detect signals from the other macro cells. The serving cell 704 may transmit 708 a configuration message to the UE 702 indicating a BFD RS monitoring set for the UE 702 to monitor. The BFD RS monitoring set may include information about BFD RS beams 710 from the serving cell 704 the UE 702 may monitor, as well BFD RS beams 712 transmitted from other cells, such as the candidate cell 706 the UE 702 may monitor. In some cases, the UE 702 may be pre-configured with information for more BFD RS beams than the UE 702 may monitor. For example, the UE 702 may be configured, such as during an attach procedure, with a set of nearby cells which the UE 702 may monitor. This set of nearby cells may be too large for the UE 702 to realistically monitor. The BFD RS monitoring set may be a subset of the set of nearby cells that may be monitored by the UE 702 and the BFD RS monitoring set may include candidate cells which the UE 702 is more likely to connect to. In some cases, the set of nearby cells may be based on a TCI and a source RS indicated in the TCI for cells of the set of nearby cells may be the BFD RS to monitor. The UE 702 may periodically monitor BFD RS beams 710 (and/or NBI RS beams) from the serving cell, as well as BFD RS beams 712 (and/or NBI RS beams) from other cells, such as candidate cell 706. The UE 702 may measure the BFD RS beams 710, 712 (and/or NBI RS beams) for cells for which the UE 702 is configured for BFR. In some cases, this measurement may be performed at the L1/L2 level. In some cases, the UE 702 may report the measurements of the monitored BFD RS beams 710, 712 (and/or NBI RS beams) to the serving cell 704, and the serving cell 704 may adjust the BFD RS monitoring set 708 based on the measurement report.

In some cases, based on measurements of the BFD RS beams 710 from the serving cell 704, the UE 702 may determine that a beam failure 714 has occurred. Beam failure 714 may be based on a determination that a, for example, BLER, RSRP, RSSI, RSRQ, CQI, and/or another signal quality measurement of the BFD RS beam 710 is below a signal quality threshold. In some cases, based on measurements of the BFD RS beams 710 (and/or NBI beams), the UE 702 may determine that there are no good beams from the serving cell 704 that the UE 702 can switch to.

In some cases, while there are no good beams from the serving cell 704 to switch to, the UE 702 may determine, for example based on measurements of BFD RS beams 712 from the candidate cell 706, that there are good beams available 716 from the candidate cell 706. In some cases, a good beam may have a BLER, RSRP, RSSI, RSRQ, CQI, and/or another signal quality measurement that is above a certain signal quality threshold. In such cases, the UE 702 may transmit a BFRQ message 718 to the serving cell 704 indicating that the candidate cell 706 is a good cell to switch to. In some cases, the BFRQ message 718 may include a cell identifier (ID) of the candidate cell 706. In some cases, the BFRQ message 718 may also include a beam ID indicating a beam of the candidate cell 706 the UE 702 has determined would be good to switch to. In some cases, the beam ID may be an RS ID for the candidate cell 706. In some cases, the BFRQ message 718 may be a MAC-CE message transmitted in the PUSCH to the serving cell 704. In some cases, the BFRQ message 718 may be sent in a RACH message. In some cases, the signal quality threshold for determining that a beam failure has occurred and the signal quality threshold for determining whether a beam is a good beam may be the same or different signal quality thresholds.

In some cases, where the BFRQ message 718 indicates a new cell ID for the candidate cell 706 (e.g., no good beams for the serving cell 704, but good beams available from the candidate cell 706), the BFRQ message 718 may trigger a serving cell switch to the candidate cell 706 on the network side.

On the UE side, the UE may receive a BFRR 720 transmitted by the serving cell 704 to the UE 702 in response to the BFRQ message 718. In some cases, after receiving the BFRR 720, the UE may autonomously switch serving cells 722 to the candidate cell 706 after a predefined time. For example, the UE 702 may autonomously switch to a beam from the candidate cell 706 28 symbols after receiving the BFRR 720. In other cases, the UE 702 may receive the BFRR 720 and wait to receive an indication to change serving cells to the candidate cell 706. Based on a received indication to change serving cells, the UE 702 may then switch serving cells 722 to candidate cell 706. In some cases, the BFRR 720 may be a UL grant (sent via DCI) scheduling new data with the same HARQ process ID as the MAC-CE PUSCH. In cases where the BFRQ message 718 is sent in a RACH message, then the BFRR 720 may sent as a PDCCH message using a predefined scrambling sequence via a predefined resource. In some cases, switching cells to the candidate cell 706 may be performed using any cell switching technique.

In some cases, the UE 702 may monitor for BFD (e.g., be configured for BFR) in candidate cells 706. As indicated above, the UE 702 may be configured to monitor beams of candidate cells, for example, in preparation for cell switching, and report if BFD occurs. For example, based on measurements of the BFD RS beams 712 (and/or NBI beams), from the candidate cell 706, the UE 702 may determine that a BFD has occurred. In some cases, the BFD determination may be based on BLER, RSRP, or another signal quality measurement of the BFD RS beam 712.

In some cases, the UE may determine that there are no good beams from the candidate cell 706 (e.g., first candidate cell). In such cases, the UE may also attempt to identify good beams for another candidate cell (e.g., second candidate cell, not shown). In some cases, the other candidate cell (e.g., second candidate cell) may be a cell where BFR is not currently configured. If a good beam is identified for the other candidate cell (e.g., second candidate cell), the UE may transmit a BFRQ message to the serving cell 716 indicating that there are no good beams for the candidate cell 706 and identifying the other candidate cell (e.g., a second candidate cell ID). In some cases, the UE 702 may also include a beam ID indicating a beam of the other candidate cell (e.g., second candidate cell) that is good. In some cases, the serving cell 704 may update the TCI, for example, to prepare to switch to the other candidate cell. In some cases, BFRQ message may trigger the serving cell to deactivate the BFR process for the candidate cell 706. If the BFRQ message includes a cell ID of the other candidate cell, the serving cell 704 may activate the BFR process for the other candidate cell to start monitoring BFR RS from the other candidate cell.

The UE 702 may then stop monitoring the BFD RS 712 of the candidate cell 706 and monitor the BFD RS of the other candidate cell (e.g., second candidate cell). In some cases, the UE 702 may stop monitoring the BFD RS 712 of the candidate cell 706 and monitor the other candidate cell (e.g., second candidate cell) autonomously after receiving the BFRQ message (e.g., in a BFRR). In some cases, the UE 702 may stop monitoring the BFD RS 712 of the candidate cell 706 and monitor the other candidate cell (e.g., second candidate cell) based on an BFR deactivation/activation indication transmitted by the serving cell 704 to the UE 702. In some cases, the BFR deactivation/activation indication may be sent via RRC, MAC-CE, and/or DCI message. The BFR activation/deactivation may deactivate/activate a preconfigured BFR configuration for the other candidate cell. For example, BFR configurations the set of nearby cells may be transmitted to the UE via higher level RRC signaling during a configuration process. Then a L1/L2 MAC-CE/DCI message may be used to activate/deactivate a BFR configuration for a candidate cell from the set of nearby cells.

Figure 8:
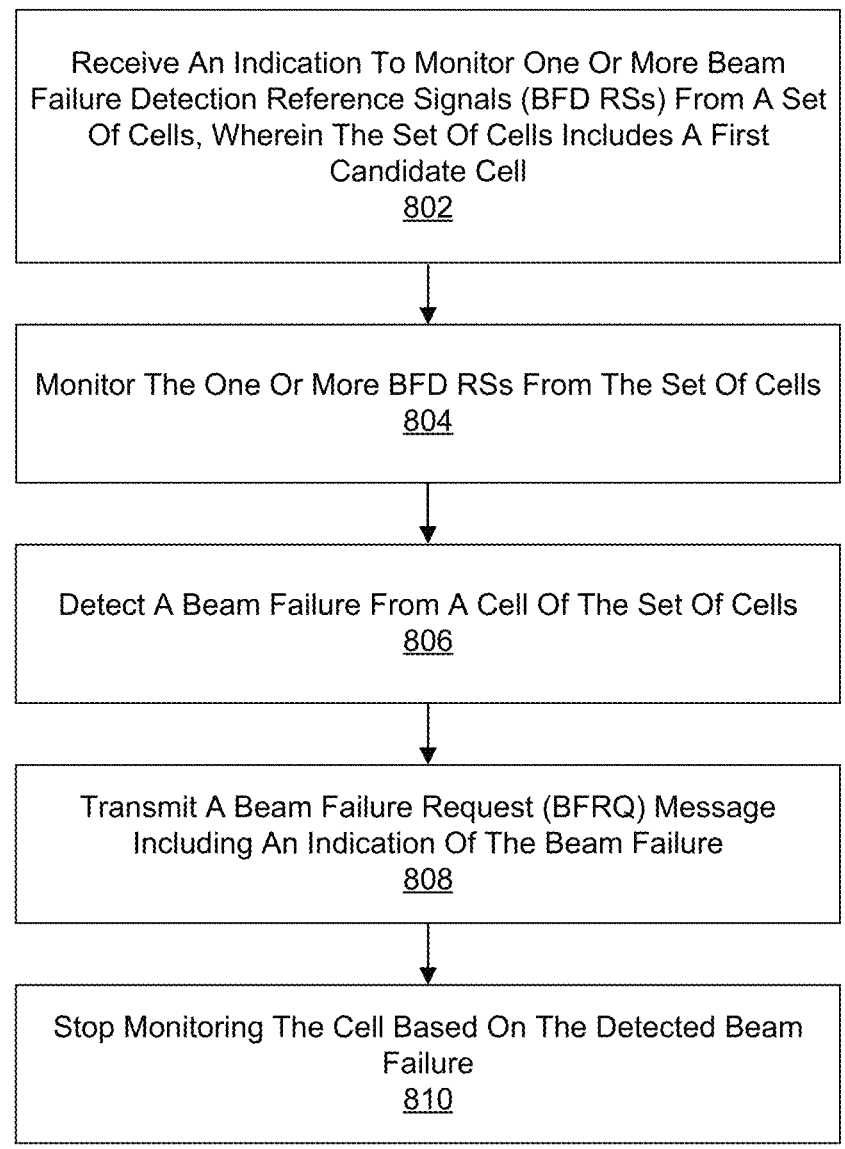
FIG. 8 is a flow diagram of a process for accessing a wireless system, in accordance with aspects of the present disclosure

FIG. 8 is a flow diagram of a process 800 for accessing a wireless system, in accordance with aspects of the present disclosure. The process 800 may be performed by a computing device (or apparatus) or a component (e.g., a chipset, codec, etc.) of the computing device. The computing device may be a mobile device (e.g., a UE, such as UEs 104, 152, 164, and 182 of FIG. 1 and FIG. 2, wireless device 407 of FIG. 4, UE 602 of FIG. 6, UE 702 of FIG. 7, and/or computing system 900 of FIG. 9), a network-connected wearable such as a watch, an extended reality (XR) device such as a virtual reality (VR) device or augmented reality (AR) device, a vehicle or component or system of a vehicle, or other type of computing device. The operations of the process 800 may be implemented as software components that are executed and run on one or more processors.

At block 802, the computing device (or component thereof) may receive an indication to monitor one or more beam failure detection reference signals (BFD RSs) from a set of cells. In some cases, the set of cells includes a first candidate cell. At block 804, the computing device (or component thereof) may monitor the one or more BFD RSs from the set of cells.

At block 806, the computing device (or component thereof) may detect a beam failure from a cell of the set of cells. In some cases, the cell from which the beam failure is detected comprises a serving cell. In some cases, the computing device (or component thereof) may determine that beams from the serving cell do not meet a first signal quality threshold. In some cases, the computing device (or component thereof) may determine that beams from the first candidate cell meet a second signal quality threshold. In some cases, the BFRQ message includes an indication of the first candidate cell. In some cases, the detected beam failure is from the first candidate cell. In some cases, the computing device (or component thereof) may transmit the indication of the beam failure to a serving cell of the set of cells.

At block 808, the computing device (or component thereof) may transmit a beam failure request (BFRQ) message including an indication of the beam failure. In some cases, the computing device (or component thereof) may receive a response to the BFRQ message. In some cases, the computing device (or component thereof) may perform cell switching to the first candidate cell based on the response to the BFRQ message. In some cases, the computing device (or component thereof) may perform cell switching autonomously after a predefined time period. In some cases, the computing device (or component thereof) may receive an indication to perform cell switching. In some cases, the computing device (or component thereof) may perform the cell switching based on the received indication. In some cases, the BFRQ message includes an identifier for the first candidate cell and an identifier for a beam of the first candidate cell.

In some cases, the cell from which the beam failure is detected comprises the first candidate cell. In some cases, the computing device (or component thereof) may determine that beams from the first candidate cell do not meet a first signal quality threshold. In some cases, the BFRQ message includes an indication of the beam failure for the first candidate cell. In some cases, the computing device (or component thereof) may stop monitoring BFD RSs from the first candidate cell. In some cases, the computing device (or component thereof) may determine that beams from a second candidate cell meet a second signal quality threshold. In some cases, the BFRQ message includes an indication of the second candidate cell. In some cases, the computing device (or component thereof) may receive an indication to start monitoring BFD RSs from the second candidate cell. In some cases, the computing device (or component thereof) may start monitoring the BFD RSs from the second candidate cell based on the received indication.

At block 810, the computing device (or component thereof) may stop monitoring the cell based on the detected beam failure. In some cases, the computing device (or component thereof) may stop monitoring the BFD RSs from the first candidate cell autonomously after a predefined time period. In some cases, the computing device (or component thereof) may receive an indication to stop monitoring the BFD RSs from the first candidate cell. In some cases, the computing device (or component thereof) may stop monitoring the BFD RSs from the first candidate cell based on the received indication.

In some examples, the processes described herein (e.g., process 800 and/or other process described herein) may be performed by a computing device or apparatus (e.g., a UE or a base station). In another example, the process 800 may be performed by the UE 104 of FIG. 1. In another example, the process 800 may be performed by a computing device with the computing system 900 shown in FIG. 9.

Figure 9:
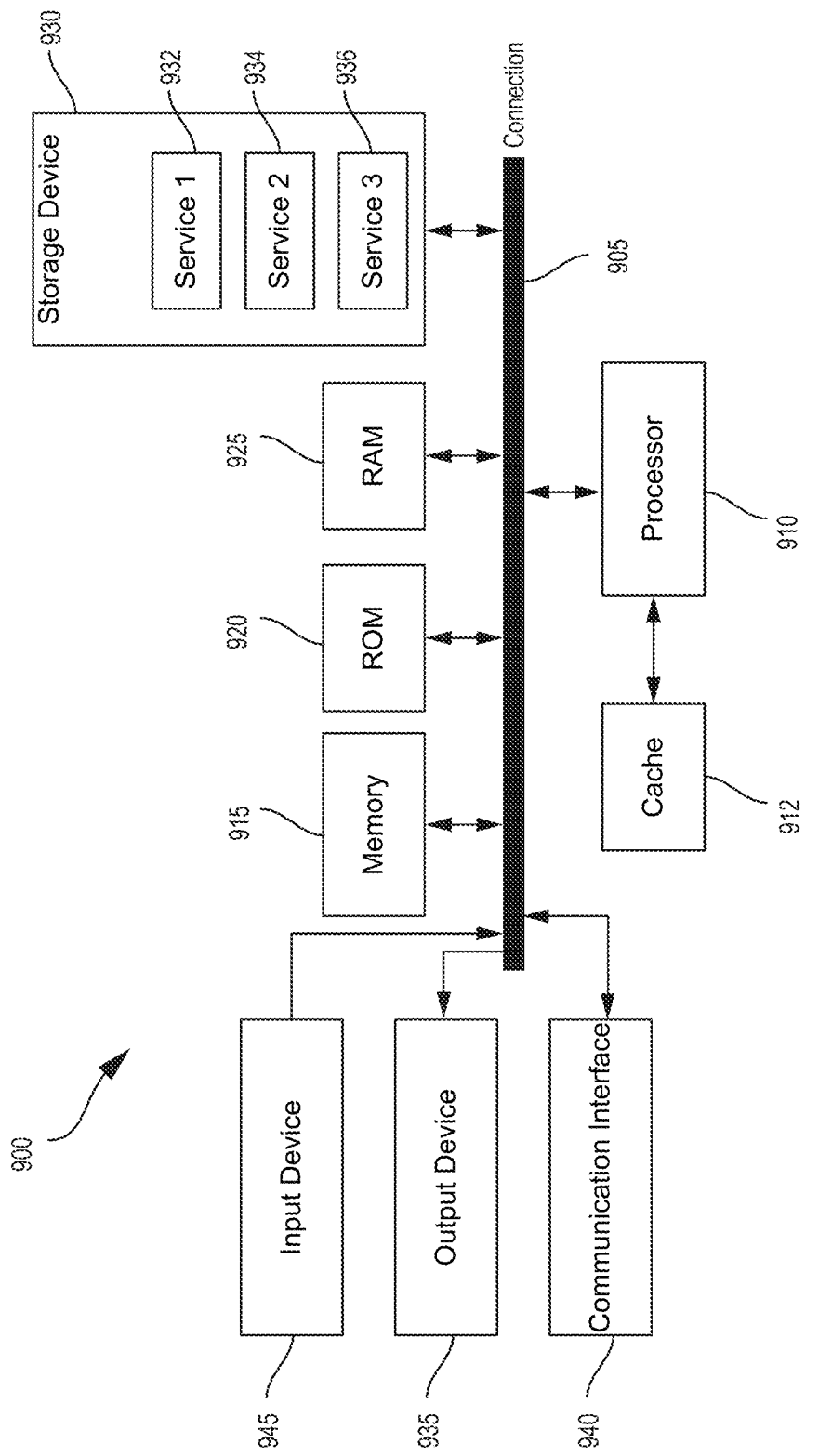
FIG. 9 is a diagram illustrating an example of a computing system, according to aspects of the disclosure.

FIG. 9 is a diagram illustrating an example of a system for implementing certain aspects of the present technology. In particular, FIG. 9 illustrates an example of computing system 900, which may be for example any computing device making up internal computing system, a remote computing system, a camera, or any component thereof in which the components of the system are in communication with each other using connection 905. Connection 905 may be a physical connection using a bus, or a direct connection into processor 910, such as in a chipset architecture. Connection 905 may also be a virtual connection, networked connection, or logical connection.

In some embodiments, computing system 900 is a distributed system in which the functions described in this disclosure may be distributed within a datacenter, multiple data centers, a peer network, etc. In some embodiments, one or more of the described system components represents many such components each performing some or all of the function for which the component is described. In some embodiments, the components may be physical or virtual devices.

Example system 900 includes at least one processing unit (CPU or processor) 910 and connection 905 that communicatively couples various system components including system memory 915, such as read-only memory (ROM) 920 and random access memory (RAM) 925 to processor 910. Computing system 900 may include a cache 912 of high-speed memory connected directly with, in close proximity to, or integrated as part of processor 910.

Processor 910 may include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which may represent any number of input mechanisms, such as a microphone for speech, a touch-sensitive screen for gesture or graphical input, keyboard, mouse, motion input, speech, etc. Computing system 900 may also include output device 935, which may be one or more of a number of output mechanisms. In some instances, multimodal systems may enable a user to provide multiple types of input/output to communicate with computing system 900.

Computing system 900 may include communications interface 940, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 930 may include software services, servers, services, etc., that when the code that defines such software is executed by the processor 910, it causes the system to perform a function. In some embodiments, a hardware service that performs a particular function may include the software component stored in a computer-readable medium in connection with the necessary hardware components, such as processor 910, connection 905, output device 935, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B.

Illustrative aspects of the disclosure include:

Aspect 1. An apparatus for wireless communications, comprising: at least one memory comprising instructions; and at least one processor coupled to the at least one memory and configured to: receive an indication to monitor one or more beam failure detection reference signals (BFD RSs) from a set of cells, wherein the set of cells includes a first candidate cell; monitor the one or more BFD RSs from the set of cells; detect a beam failure from a cell of the set of cells; transmit a beam failure request (BFRQ) message including an indication of the beam failure; and stop monitoring the cell based on the detected beam failure.

Aspect 2. The apparatus of Aspect 1, wherein the cell from which the beam failure is detected comprises a serving cell, and wherein the at least one processor is further configured to: determine that beams from the serving cell do not meet a first signal quality threshold; and determine that beams from the first candidate cell meet a second signal quality threshold, wherein the BFRQ message includes an indication of the first candidate cell.

Aspect 3. The apparatus of Aspect 2, wherein the at least one processor is further configured to: receive a response to the BFRQ message; and perform cell switching to the first candidate cell based on the response to the BFRQ message.

Aspect 4. The apparatus of Aspect 3, wherein the at least one processor is further configured to perform cell switching autonomously after a predefined time period.

Aspect 5. The apparatus of Aspect 3, wherein the at least one processor is further configured to: receive an indication to perform cell switching; and perform the cell switching based on the received indication.

Aspect 6. The apparatus of any of Aspects 2-5, wherein the BFRQ message includes an identifier for the first candidate cell and an identifier for a beam of the first candidate cell.

Aspect 7. The apparatus of Aspect 1, wherein the cell from which the beam failure is detected comprises the first candidate cell, and wherein the at least one processor is further configured to: determine that beams from the first candidate cell do not meet a first signal quality threshold, wherein the BFRQ message includes an indication of the beam failure for the first candidate cell; and stop monitoring BFD RSs from the first candidate cell.

Aspect 8. The apparatus of Aspect 7, wherein the at least one processor is further configured to stop monitoring the BFD RSs from the first candidate cell autonomously after a predefined time period.

Aspect 9. The apparatus of Aspect 7, wherein the at least one processor is further configured to: receive an indication to stop monitoring the BFD RSs from the first candidate cell; and stop monitoring the BFD RSs from the first candidate cell based on the received indication.

Aspect 10. The apparatus of Aspect 7, wherein the at least one processor is further configured to determine that beams from a second candidate cell meet a second signal quality threshold, and wherein the BFRQ message includes an indication of the second candidate cell.

Aspect 11. The apparatus of Aspect 10, wherein the at least one processor is further configured to: receive an indication to start monitoring BFD RSs from the second candidate cell; and start monitoring the BFD RSs from the second candidate cell based on the received indication.

Aspect 12. The apparatus of any of Aspects 1, and 7-11, wherein the detected beam failure is from the first candidate cell, and wherein the at least one processor is configured to transmit the indication of the beam failure to a serving cell of the set of cells.

Aspect 13. A method for wireless communications, comprising; receiving an indication to monitor one or more beam failure detection reference signals (BFD RSs) from a set of cells, wherein the set of cells includes a first candidate cell; monitoring the one or more BFD RSs from the set of cells; detecting a beam failure from a cell of the set of cells; transmitting a beam failure request (BFRQ) message including an indication of the beam failure; and stopping monitoring the cell based on the detected beam failure.

Aspect 14. The method of Aspect 13, wherein the cell from which the beam failure is detected comprises a serving cell, and further comprising: determining that beams from the serving cell do not meet a first signal quality threshold; and determining that beams from the first candidate cell meet a second signal quality threshold, wherein the BFRQ message includes an indication of the first candidate cell.

Aspect 15. The method of Aspect 14, further comprising: receiving a response to the BFRQ message; and performing cell switching to the first candidate cell based on the response to the BFRQ message.

Aspect 16. The method of Aspect 15, further comprising performing cell switching autonomously after a predefined time period.

Aspect 17. The method of Aspect 15, further comprising: receiving an indication to perform cell switching; and performing the cell switching based on the received indication.

Aspect 18. The method of any of Aspects 14-18, wherein the BFRQ message includes an identifier for the first candidate cell and an identifier for a beam of the first candidate cell.

Aspect 19. The method of Aspect 13, wherein the cell from which the beam failure is detected comprises the first candidate cell, and further comprising: determining that beams from the first candidate cell do not meet a first signal quality threshold, wherein the BFRQ message includes an indication of the beam failure for the first candidate cell; and stopping monitoring BFD RSs from the first candidate cell.

Aspect 20. The method of Aspect 19, further comprising stopping monitoring the BFD RSs from the first candidate cell autonomously after a predefined time period.

Aspect 21. The method of Aspect 19, further comprising: receiving an indication to stop monitoring the BFD RSs from the first candidate cell; and stopping monitoring the BFD RSs from the first candidate cell based on the received indication.

Aspect 22. The method of Aspect 19, further comprising determining that beams from a second candidate cell meet a second signal quality threshold, and wherein the BFRQ message includes an indication of the second candidate cell.

Aspect 23. The method of Aspect 22, further comprising: receiving an indication to start monitoring BFD RSs from the second candidate cell; and starting monitoring the BFD RSs from the second candidate cell based on the received indication.

Aspect 24. The method of any of Aspects 13, and 19-23, wherein the detected beam failure is from the first candidate cell, and further comprising transmitting the indication of the beam failure to a serving cell of the set of cells.

Aspect 25. A non-transitory computer-readable medium having stored thereon instructions that, when executed by at least one processor, cause the at least one processor to: receive an indication to monitor one or more beam failure detection reference signals (BFD RSs) from a set of cells, wherein the set of cells includes a first candidate cell; monitor the one or more BFD RSs from the set of cells; detect a beam failure from a cell of the set of cells; transmit a beam failure request (BFRQ) message including an indication of the beam failure; and stop monitoring the cell based on the detected beam failure.

Aspect 26. The non-transitory computer-readable medium of Aspect 25, wherein the cell from which the beam failure is detected comprises a serving cell, and wherein the instructions cause the at least one processor to: determine that beams from the serving cell do not meet a first signal quality threshold; and determine that beams from the first candidate cell meet a second signal quality threshold, wherein the BFRQ message includes an indication of the first candidate cell.

Aspect 27. The non-transitory computer-readable medium of Aspect 26, wherein the instructions cause the at least one processor to: receive a response to the BFRQ message; and perform cell switching to the first candidate cell based on the response to the BFRQ message.

Aspect 28. The non-transitory computer-readable medium of Aspect 27, wherein the instructions cause the at least one processor to perform cell switching autonomously after a predefined time period.

Aspect 29. The non-transitory computer-readable medium of any of Aspects 27, wherein the instructions cause the at least one processor to: receive an indication to perform cell switching; and perform the cell switching based on the received indication.

Aspect 30. The non-transitory computer-readable medium of Aspect 26, wherein the cell from which the beam failure is detected comprises the first candidate cell, and wherein the instructions cause the at least one processor to: determine that beams from the first candidate cell do not meet a first signal quality threshold, wherein the BFRQ message includes an indication of the beam failure for the first candidate cell; and stop monitoring BFD RSs from the first candidate cell.

Aspect 31. The non-transitory computer-readable medium of Aspect 26, wherein the BFRQ message includes an identifier for the first candidate cell and an identifier for a beam of the first candidate cell.

Aspect 32. The non-transitory computer-readable medium of Aspect 25, wherein the cell from which the beam failure is detected comprises the first candidate cell, and wherein the instructions cause at least one processor is to: determine that beams from the first candidate cell do not meet a first signal quality threshold, wherein the BFRQ message includes an indication of the beam failure for the first candidate cell; and stop monitoring BFD RSs from the first candidate cell.

Aspect 33. The non-transitory computer-readable medium of Aspect 32, wherein the at least one processor is further configured to stop monitoring the BFD RSs from the first candidate cell autonomously after a predefined time period.

Aspect 34. The non-transitory computer-readable medium of Aspect 32, wherein the at least one processor is further configured to: receive an indication to stop monitoring the BFD RSs from the first candidate cell; and stop monitoring the BFD RSs from the first candidate cell based on the received indication.

Aspect 35. The non-transitory computer-readable medium of Aspect 32, wherein the at least one processor is further configured to determine that beams from a second candidate cell meet a second signal quality threshold, and wherein the BFRQ message includes an indication of the second candidate cell.

Aspect 36. The non-transitory computer-readable medium of Aspect 35, wherein the at least one processor is further configured to: receive an indication to start monitoring BFD RSs from the second candidate cell; and start monitoring the BFD RSs from the second candidate cell based on the received indication.

Aspect 37. The non-transitory computer-readable medium of Aspect 25, wherein the detected beam failure is from the first candidate cell, and wherein the at least one processor is configured to transmit the indication of the beam failure to a serving cell of the set of cells Abstract 38. An apparatus for wireless communications, comprising: means for performing a method according to any of Aspects 13-24.

What is claimed is:

1. An apparatus for wireless communications, comprising:
   at least one memory comprising instructions; and
   at least one processor coupled to the at least one memory and configured to:
   receive an indication to monitor one or more beam failure detection reference signals (BFD RSs) from a set of cells, wherein the set of cells includes a first candidate cell;
   monitor the one or more BFD RSs from the set of cells;
   detect a beam failure from the first candidate cell of the set of cells;
   determine that beams from the first candidate cell do not meet a first signal quality threshold;

transmit a beam failure request (BFRQ) message including an indication of the beam failure, wherein the BFRQ message includes an indication of the beam failure for the first candidate cell; and
stop monitoring the first candidate cell based on the detected beam failure.

2. The apparatus of claim 1, wherein the cell from which the beam failure is detected comprises a serving cell, and wherein the at least one processor is further configured to:
determine that beams from the serving cell do not meet a first signal quality threshold; and
determine that beams from the first candidate cell meet a second signal quality threshold, wherein the BFRQ message includes an indication of the first candidate cell.

3. The apparatus of claim 2, wherein the at least one processor is further configured to:
receive a response to the BFRQ message; and
perform cell switching to the first candidate cell based on the response to the BFRQ message.

4. The apparatus of claim 3, wherein the at least one processor is further configured to perform cell switching autonomously after a predefined time period.

5. The apparatus of claim 3, wherein the at least one processor is further configured to:
receive an indication to perform cell switching; and
perform the cell switching based on the received indication.

6. The apparatus of claim 2, wherein the BFRQ message includes an identifier for the first candidate cell and an identifier for a beam of the first candidate cell.

7. The apparatus of claim 1, wherein the at least one processor is further configured to stop monitoring the BFD RSs from the first candidate cell autonomously after a predefined time period.

8. The apparatus of claim 1, wherein the at least one processor is further configured to:
receive an indication to stop monitoring the BFD RSs from the first candidate cell; and
stop monitoring the BFD RSs from the first candidate cell based on the received indication.

9. The apparatus of claim 1, wherein the at least one processor is further configured to determine that beams from a second candidate cell meet a second signal quality threshold, and wherein the BFRQ message includes an indication of the second candidate cell.

10. The apparatus of claim 9, wherein the at least one processor is further configured to:
receive an indication to start monitoring BFD RSs from the second candidate cell; and
start monitoring the BFD RSs from the second candidate cell based on the received indication.

11. The apparatus of claim 1, wherein the detected beam failure is from the first candidate cell, and wherein the at least one processor is configured to transmit the indication of the beam failure to a serving cell of the set of cells.

12. A method for wireless communications, comprising;
receiving an indication to monitor one or more beam failure detection reference signals (BFD RSs) from a set of cells, wherein the set of cells includes a first candidate cell;
monitoring the one or more BFD RSs from the set of cells;
detecting a beam failure from the first candidate cell of the set of cells;
determining that beams from the first candidate cell do not meet a first signal quality threshold;
transmitting a beam failure request (BFRQ) message including an indication of the beam failure, wherein the BFRQ message includes an indication of the beam failure for the first candidate cell; and
stopping monitoring the first candidate cell based on the detected beam failure.

13. The method of claim 12, wherein the cell from which the beam failure is detected comprises a serving cell, and further comprising:
determining that beams from the serving cell do not meet a first signal quality threshold; and
determining that beams from the first candidate cell meet a second signal quality threshold, wherein the BFRQ message includes an indication of the first candidate cell.

14. The method of claim 13, further comprising:
receiving a response to the BFRQ message; and
performing cell switching to the first candidate cell based on the response to the BFRQ message.

15. The method of claim 14, further comprising performing cell switching autonomously after a predefined time period.

16. The method of claim 14, further comprising:
receiving an indication to perform cell switching; and
performing the cell switching based on the received indication.

17. The method of claim 13, wherein the BFRQ message includes an identifier for the first candidate cell and an identifier for a beam of the first candidate cell.

18. The method of claim 13, further comprising stopping monitoring the BFD RSs from the first candidate cell autonomously after a predefined time period.

19. The method of claim 13, further comprising:
receiving an indication to stop monitoring the BFD RSs from the first candidate cell; and
stopping monitoring the BFD RSs from the first candidate cell based on the received indication.

20. The method of claim 13, further comprising determining that beams from a second candidate cell meet a second signal quality threshold, and wherein the BFRQ message includes an indication of the second candidate cell.

21. The method of claim 20, further comprising:
receiving an indication to start monitoring BFD RSs from the second candidate cell; and
starting monitoring the BFD RSs from the second candidate cell based on the received indication.

22. The method of claim 12, wherein the detected beam failure is from the first candidate cell, and further comprising transmitting the indication of the beam failure to a serving cell of the set of cells.

23. A non-transitory computer-readable medium having stored thereon instructions that, when executed by at least one processor, cause the at least one processor to:
receive an indication to monitor one or more beam failure detection reference signals (BFD RSs) from a set of cells, wherein the set of cells includes a first candidate cell;
monitor the one or more BFD RSs from the set of cells;
detect a beam failure from the first candidate cell of the set of cells;
determine that beams from the first candidate cell do not meet a first signal quality threshold;
transmit a beam failure request (BFRQ) message including an indication of the beam failure, wherein the BFRQ message includes an indication of the beam failure for the first candidate cell; and stop monitoring the first candidate cell based on the detected beam failure.

24. The non-transitory computer-readable medium of claim 23, wherein the cell from which the beam failure is detected comprises a serving cell, and wherein the instructions cause the at least one processor to:
   determine that beams from the serving cell do not meet a first signal quality threshold; and
   determine that beams from the first candidate cell meet a second signal quality threshold, wherein the BFRQ message includes an indication of the first candidate cell.

25. The non-transitory computer-readable medium of claim 24, wherein the instructions cause the at least one processor to:
   receive a response to the BFRQ message; and
   perform cell switching to the first candidate cell based on the response to the BFRQ message.

26. The non-transitory computer-readable medium of claim 25, wherein the instructions cause the at least one processor to perform cell switching autonomously after a predefined time period.

27. The non-transitory computer-readable medium of claim 25, wherein the instructions cause the at least one processor to:
   receive an indication to perform cell switching; and
   perform the cell switching based on the received indication.

28. The non-transitory computer-readable medium of claim 23, wherein the instructions cause the at least one processor to stop monitoring the BFD RSs from the first candidate cell autonomously after a predefined time period.

29. The non-transitory computer-readable medium of claim 23, wherein the instructions cause the at least one processor to:
   receive an indication to stop monitoring the BFD RSs from the first candidate cell; and
   stop monitoring the BFD RSs from the first candidate cell based on the received indication.

30. The non-transitory computer-readable medium of claim 23, wherein the instructions cause the at least one processor to determine that beams from a second candidate cell meet a second signal quality threshold, and wherein the BFRQ message includes an indication of the second candidate cell.

* * * * *